(12) United States Patent
Lin et al.

(10) Patent No.: US 10,025,092 B1
(45) Date of Patent: Jul. 17, 2018

(54) PROJECTOR AND PROJECTING LENS THEREOF

(71) Applicant: JAU LAANG INDUSTRIAL CO., LTD., Taichung (TW)

(72) Inventors: Yi-Jou Lin, Taichung (TW); Hsin-Ying Wu, Taichung (TW)

(73) Assignee: JAU LAANG INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 15/725,611

(22) Filed: Oct. 5, 2017

(51) Int. Cl.
| | | |
|---|---|---|
| *G03B 13/16* | (2006.01) | |
| *G03B 9/50* | (2006.01) | |
| *G02B 27/00* | (2006.01) | |
| *G03B 21/14* | (2006.01) | |
| *G03B 21/28* | (2006.01) | |
| *G02B 13/16* | (2006.01) | |
| *G02B 9/50* | (2006.01) | |

(52) U.S. Cl.
CPC ........... *G02B 27/0018* (2013.01); *G02B 9/50* (2013.01); *G02B 13/16* (2013.01); *G03B 21/147* (2013.01); *G03B 21/28* (2013.01)

(58) Field of Classification Search
CPC ............. G02B 13/16; G02B 9/50; G02B 9/12
USPC ......................................... 359/649, 716, 784
See application file for complete search history.

(56) References Cited

U.S. PATENT DOCUMENTS

| | | | | |
|---|---|---|---|---|
| 9,417,443 | B2* | 8/2016 | Lin ........................ | G02B 17/08 |
| 9,448,464 | B2* | 9/2016 | Lin ........................ | G02B 21/28 |
| 2004/0233540 | A1* | 11/2004 | Tadic-Galeb .......... | G02B 13/16 |
| | | | | 359/619 |
| 2007/0195427 | A1* | 8/2007 | Sugita .................. | G02B 15/177 |
| | | | | 359/692 |
| 2008/0151364 | A1* | 6/2008 | Shafer ................ | G02B 17/0812 |
| | | | | 359/365 |

* cited by examiner

*Primary Examiner* — William C Dowling
(74) *Attorney, Agent, or Firm* — Tracy Heims; Apex Juris, PLLC.

(57) ABSTRACT

A projector including an image beam generator and a projecting lens is disclosed. The image beam generator is adapted to generate an image beam. The projecting lens includes a relay system and a projection system. The relay system is adapted to receive the image beam. The projection system includes a first lens and a second lens. A reflective coating is formed on a surface of the first lens. Whereby, the image beam generated by the image beam generator is transmitted through the second lens to the first lens, and reflected by the reflective coating of the first lens. Then, the image beam reflected by the first lens is transmitted through the second lens again and projected on an image plane.

14 Claims, 4 Drawing Sheets

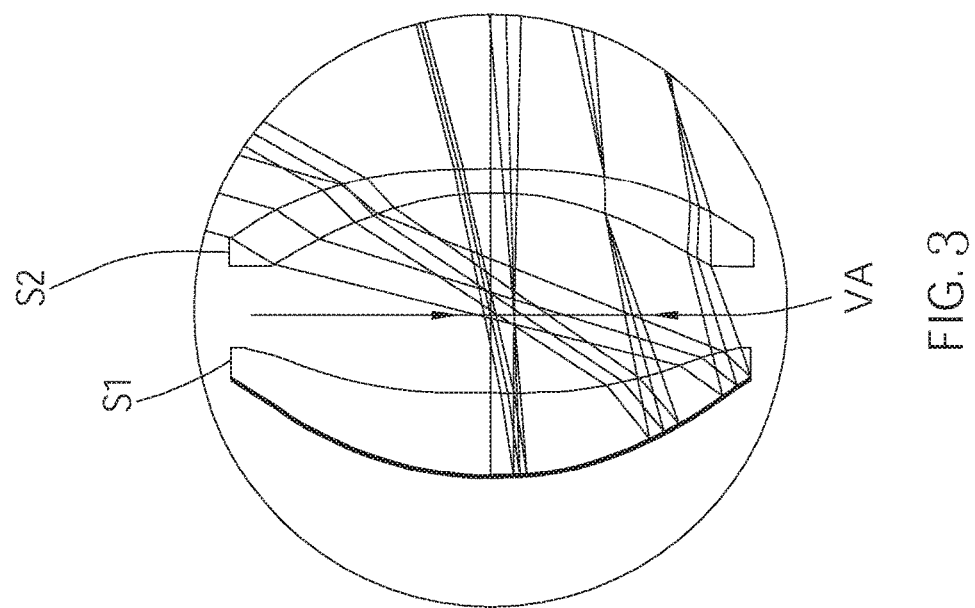

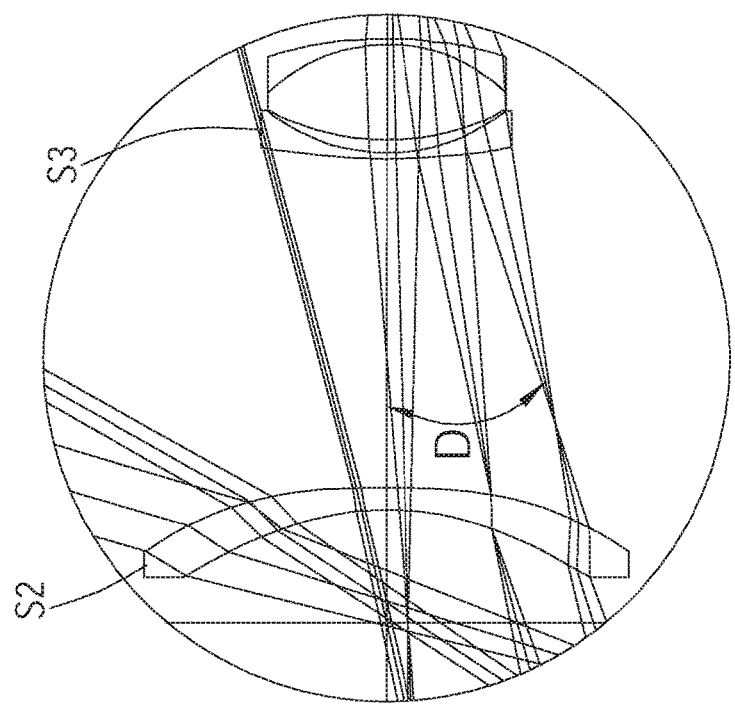

PROJECTOR AND PROJECTING LENS THEREOF

BACKGROUND OF THE INVENTION

1. Technical Field

The present invention is related to an optical projecting device, and more particularly to a projector capable of reducing image defects such as ghost image and a projecting lens thereof.

2. Description of Related Art

With advancement in video and optoelectronic technologies, projecting devices, such as projectors, have become more and more popular. Projecting devices not only can be used in a video conference at a working place, but also can be used in a home theater as family entertainment. In the projecting devices, a projecting lens is the most important element for clearly showing images on a screen.

In order to use the projecting devices in a limited space, short-throw projection is a common requirement in the modern projector. A conventional projecting lens for short-throw projection usually has a lot of large lenses to obtain short-throw projection and high optical performance.

However, the conventional projecting lens for short-throw projection includes a large size and a heavy weight, and conflicts with the current demand of miniaturization and lightweight for projecting devices. In order to improve the above drawback, a rear-projection projector is provided into the market. The rear-projection projector is provided with a reflector to reflect the image beam of the projecting device on a screen so as to achieve the demand of miniaturization and lightweight. The conventional rear-projection projector is easy to generate smudge and flare since the image beams thereof are reflected between the lenses for multiple times. For example, multiple reflections are easily occurred between the reflective mirror and the lenses, and between each of the lenses, such that image defects by overlay image or ghost image are generated on the projected image. It not only decreases the projected image quality, but also affects the image composition and results in operation problems for users.

Therefore, it still requires a projection device which is capable of reducing or minimizing the image defects, such as ghost image, and providing high-quality projected images.

BRIEF SUMMARY OF THE INVENTION

In view of the above, an object of the present invention is to provide a projector capable of effectively improving ghost image problems and a projecting lens thereof.

The present invention provides a projector including an image beam generator and a projecting lens. The image beam generator is adapted to generate an image beam. The projecting lens is adapted to receive the image beam and project the image beam to an image plane. The projecting lens includes a relay system and a projection system. Wherein, the relay system is disposed between the image beam generator and the projection system, and is adapted to receive the image beam. The projection system includes a first lens and a second lens. The first lens includes a first optical surface and a second optical surface which are opposite to each other. A reflective coating is formed on the first optical surface. The second lens is disposed between the first lens and the relay system. The second lens includes a third optical surface and a fourth optical surface which are opposite to each other. The fourth optical surface faces toward the relay system. When the relay system receives the image beam, the image beam is transmitted through the second lens via the fourth optical surface and the third optical surface in sequence and injected into the first lens via the second optical surface. Next, the image beam is reflected by the reflective coating, and transmitted through the first lens via the second optical surface. Then, the image beam is transmitted through the second lens via the third optical surface and the fourth optical surface again and projected onto the image plane.

The present invention provides a projecting lens adapted to receive an image beam and project the image beam onto an image plane and including a relay system and a projection system. The relay system is adapted to receive the image beam. The projection system includes a first lens and a second lens. The first lens includes a first optical surface and a second optical surface which are opposite to each other. The first optical surface is formed with a reflective coating. The second lens is disposed between the first lens and the relay system. The second lens includes a third optical surface and a fourth optical surface. The fourth optical surface faces toward the relay system. When the relay system receives the image beam, the image beam is transmitted through the second lens via the fourth optical surface and the third optical surface in sequence and injected into the first lens via the second optical surface. Next, the image beam is reflected by the reflective coating, and transmitted through the first lens via the second optical surface. Then, the image beam is transmitted through the second lens via the third optical surface and the fourth optical surface again and projected onto the image plane.

The advantage of the present invention is that the image beam is repeatedly transmitted through the second lens i.e., the image beam is first transmitted through the second lens to the first lens, reflected by the reflective coating of the first lens, and transmitted from the second optical surface of the first lens to the second lens again and projected onto the image plane so as to obtain an optical design with a secondary optical effect. Whereby, the size of the projector and the projecting lens can be minimized, and a high optical efficiency also can be obtained. In addition, by reflecting the image beam back to the second optical surface via the reflective coating rather than passing it through the first optical surface of the first lens can reduce the unnecessary reflection of the image beam between the lenses so as to minimize image defects such as ghost image and improve projected image quality.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 3 is a sectional, enlarged view illustrating a position of the aperture of the projector of FIG. 2; and FIG. 4 is a sectional, enlarged view illustrating a chief ray angle of the projecting lens of FIG. 2.

DETAILED DESCRIPTION OF THE INVENTION

Figure 1:
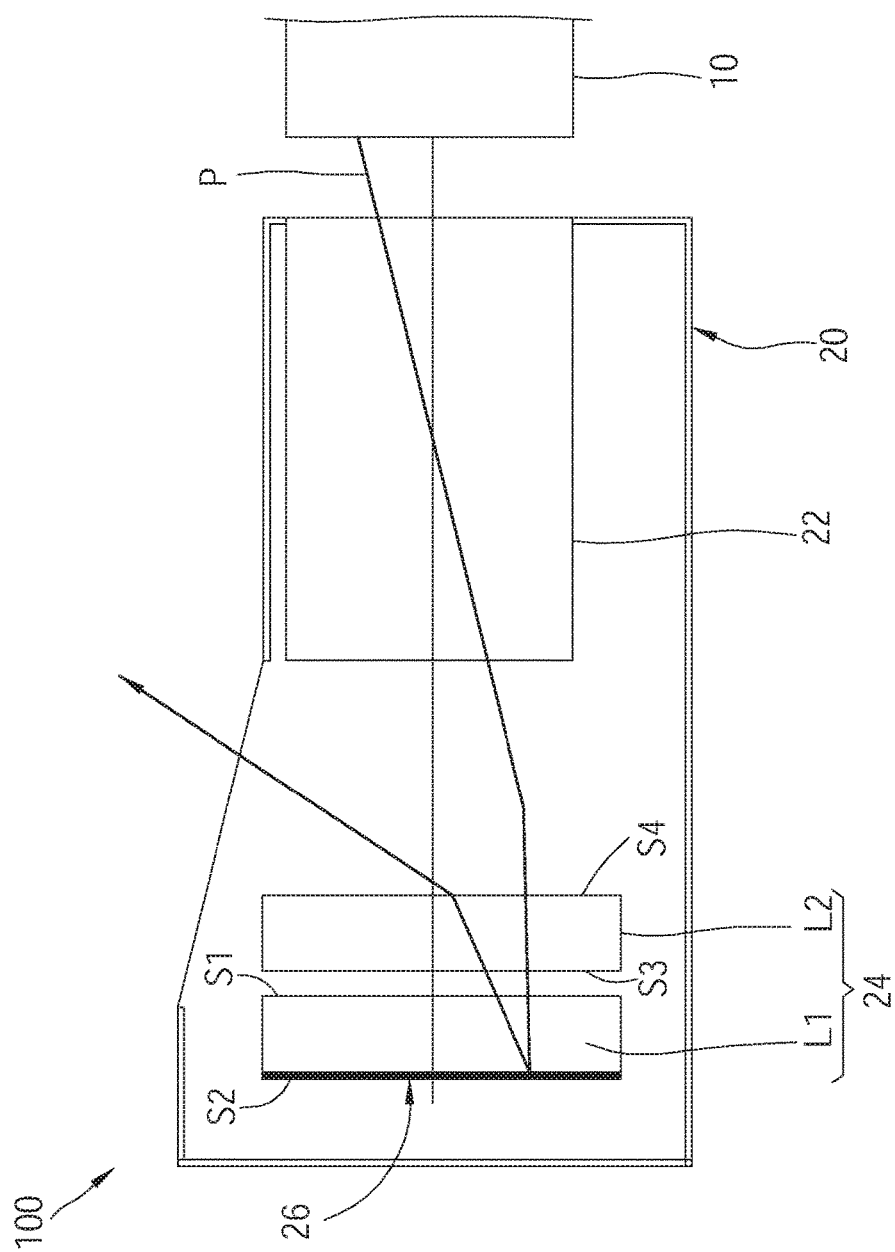
FIG. 1 is a view illustrating a configuration of a projector of an embodiment according to the present invention.
Figure 2:
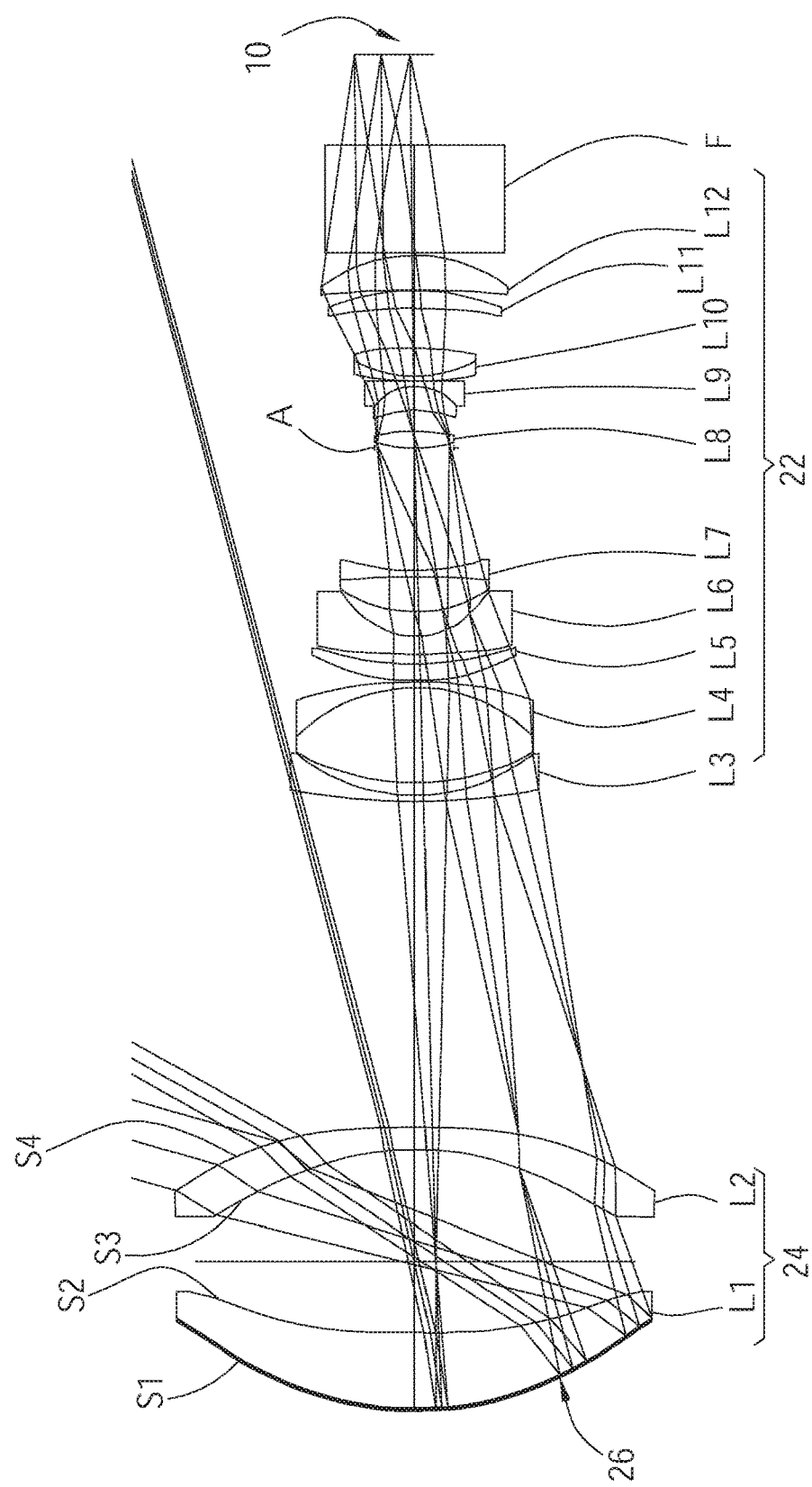
FIG. 2 is a view illustrating a configuration of the projecting lens of the projector of the embodiment.

The following illustrative embodiments and drawings are provided to illustrate the disclosure of the present invention, these and other advantages and effects can be clearly understood by persons skilled in the art after reading the disclosure of this specification. A projector 100 of an embodiment according to the present invention is shown in FIG. 1 and FIG. 2. The projector 100 includes an image beam generator 10 and a projecting lens 20.

The image beam generator 10 having a prism F is adapted to receive image data from an image source, and to generate an image beam P passing through the prism F according to the image data. The projecting lens 20 is adapted to receive the image beam P, and to project the image beam P with a predetermined optical processing to an image plane, such as projecting the image beam P to a screen to form a projected image on the screen, i.e., the image plane. However, in other embodiments having different types of optical systems, it is not limited to include a prism in the image beam generator 10. For example, in an embodiment, the image beam generator 10 can directly project the image beam P after receiving the image data to the projecting lens without using the prism F.

The projecting lens 20 includes, in order from the image beam generator 10 side, a relay system 22 and a projection system 24.

The relay system 22 includes a plurality of lenses. For example, in this embodiment, the relay system 22 includes 10 lenses including a third lens L3 and the lenses L4 to L12. Wherein, the third lens L3 and the lenses L5, L6, L8, L11, L12 are single lenses, while the lenses L4, L7, L9, L10 are compound lenses. The abovementioned compound lenses can be formed by joining two or more lenses, but it is not limited thereto. Besides, an aperture A is disposed between the lens L7 and the Lens L8. The relay system 22 is adapted to receive the image beam P and transmit the image beam P based a designed optical effect. For example, the designed optical effect includes correcting or compensating chromatic aberration included in the image beam, or introduced by outside factors, such as spherical aberration, chromatic aberration, astigmatism, field curvature, or distortion. For another example, the designed optical effect can include optical designs for adjusting an optical path of the image beam, such as focus adjustment, or zooming, but it is not limited thereto. In addition, for other application purposes, the number of the lenses or the shapes of the lenses of the relay system can be changed or modified based on different optical design or characteristic requirements.

The projection system 24 includes a first lens L1 and a second lens L2. The first lens L1 includes a first optical surface S1 and a second optical surface S2, wherein the first optical surface S1 includes a reflective coating 26. For example, in one embodiment, the first optical surface S1 can be coated with silver or aluminum coating to form the reflective coating 26, but it is not limited thereto. In other embodiments, in addition to metal coating, the reflective coating 26 can be formed of other materials, such as a dielectric coating including a ceramic dielectric coating. The second lens L2 is disposed between the first lens L1 and the relay system 22, and the second lens L2 includes a third optical surface S3 and a fourth optical surface S4 which are opposite to each other. The fourth optical surface S4 faces toward the relay system 22.

In this embodiment, the first lens L1 and the second lens L2 are both meniscus lenses. Wherein, the first optical surface S1 of the first lens L1 is a convex surface, and the second optical surface S2 of the first lens L1 is a concave surface. The third optical surface S3 of the second lens L2 is a concave surface, and the fourth optical surface S4 of the second lens L2 is a convex surface. The second optical surface S2 and the third optical surface S3 are facing with each other. Besides, as shown in FIG. 3, a virtual aperture VA is formed between the first lens L1 and the second lens L2 for converging the image beam. The virtual aperture VA is not limited to be arranged perpendicularly to the optical axis, and can be disposed with a tilt with respect to the optical axis.

Besides, the first lens L1 can be formed of materials selected from plastic or glass, but it is not limited thereto. Preferably, in this embodiment, the first lens L1 can be formed of glass so as to be performed with a high-temperature film-coating process to form a multi-layer reflective coating having good reflectivity.

Besides, a diameter of the second lens L2 is greater than or equal to a diameter of the greatest lens of the relay system 22. That is, the diameter of the greatest lens having a maximum diameter in the relay system 22 is not greater than the diameter of the second lens L2. For example, in this embodiment, the lens having a maximum diameter in the relay system 22 is the third lens L3, and the third lens L3 is a lens closest to the second lens L2 of the projection system 24. The second lens 2 includes a diameter D2 and the third lens L3 includes a diameter D3, wherein D2 and D3 satisfy the following condition: 0.3≤D3/D2≤1.0. Preferably, a ratio of the diameter D3 of the third lens L3 to the diameter D2 of the second lens L2 (D3/D2) is of about 0.8.

Besides, as shown in FIG. 4, the projecting lens 20 includes a chief ray angle (CRA) D not greater than 40 degrees. Preferably, in this embodiment, the chief ray angle D of the projecting lens 20 is not greater than 26 degrees. By utilizing the design of the projecting lens of the present invention, the chief ray angle can be effectively reduced, and the luminous flux passing through an effective optical zone can be increased. In addition, the image beam transmitted from the relay system 22 can be received by the projection system 24 having a smaller lens size such that a small-size and lightweight projecting lens can be obtained.

Whereby, as shown in FIG. 1 and FIG. 2, when the image beam P is generated by the image beam generator 10, the image beam P enters the projecting lens 20 by transmitting through the relay system 22 and the projection system 24 in sequence, and then projects onto an image plane (not shown). In detail, the image beam P enters the second lens L2 via the fourth optical surface S4, and leaves the second lens L2 via the third optical surface S3; next, the image beam P enters the first lens L1 via the second optical surface S2, and is reflected by the reflective coating 26 and leaves the first lens L1 via the second optical surface S2; then, the image beam P enters the second lens L2 via the third optical surface S3, leaves the second lens L2 via the fourth optical surface S4 and is projected onto the image plane (not shown), such as a screen, to form a projected image.

Whereby, by the above design, the image beam P can repetitively passes through the second lens L2 and the first lens L1 so as to obtain a secondary optical effect. Therefore, high optical efficiency can be realized even if the size and volume of the lenses are reduced. The projector can have a short focal length and a miniaturized size.

Moreover, by reflecting the image beam P back to the second optical surface S2 via the reflective coating 26 rather than passing it through the first optical surface S1 can make the image beam P to leave the first lens L1 without less optical quality loss and can reduce the probability of redundant and unnecessary reflection so as to minimize or remove image defects such as ghost image or glare and to improve image quality.

In addition, the second optical surface S2 of the first lens L1 can include at least one inflection point so as to further reduce image defects, such as ghost image, produced on the projection screen. Wherein, the second optical surface S2 of the first lens L1 can have at least one inflection point close to an edge of the first lens L1. For example, in this embodiment, an inflection point is formed on the second optical surface S2 of the first lens L1 with a distance of ⅓ radius from the edge of the first lens L1. Whereby, the optical path of the image beam P can be adjusted, for example, a projection angle of the image beam P on the projection screen can be adjusted. Especially, the projection angle of the image beam P passing through the area between the reflection point of the second optical surface S2 and the edge of the lens can be adjusted so as to minimize the occurrence of the image defects such as ghost image.

It is worth to mention that, in other applications, the projection system 24 can include one or more lenses disposed between the first lens L1 and the second lens L2, and it is not limited thereto. However, in this embodiment, it is preferable that the projection system 24 only includes the first lens L1 and the second lens L2. In this way, not only the number of the lenses can be minimized to reduce the manufacturing cost thereof, but also the unnecessary reflections between the lenses can be reduced. Moreover, a reflection mirror is omitted such that the light reflection between the reflection mirror and the lenses are avoided to reduce the occurrence of ghost images and to improve the image quality of the projection system.

In addition, by the design of the projecting lens 20 of this embodiment, the image beam P is injected into the projection system 24 via the lower half of the second lens L2, and then is transmitted out from the upper half of the second lens L2 to project on the image plane. Whereby, the optical paths of the image beam P before and after reflecting by the reflective coating 26 are intersected with each other. Therefore, it is effective to avoid optical interference and can improve the projected image quality.

It must be pointed out that the embodiments described above are only some embodiments of the present invention. In the above embodiment, the projector 100 and the projecting lens 20 include an optical configuration of a telecentric system, but it is not limited thereto. In other embodiments, a non-telecentric system also can be utilized. All equivalent structures which employ the concepts disclosed in this specification and the appended claims should fall within the scope of the present invention.

What is claimed is:

1. A projector, comprising:
an image beam generator, adapted to generate an image beam; and
a projecting lens, adapted to receive the image beam and project the image beam to an image plane, the projecting lens comprising a relay system and a projection system; wherein, the relay system is disposed between the image beam generator and the projection system, and is adapted to receive the image beam; the projection system comprises a first lens and a second lens; the first lens comprises a first optical surface and a second optical surface which are opposite to each other; a reflective coating is formed on the first optical surface; the second lens is disposed between the first lens and the relay system; the second lens comprises a third optical surface and a fourth optical surface which are opposite to each other; the fourth optical surface faces toward the relay system; when the relay system receives the image beam, the image beam is transmitted through the second lens via the fourth optical surface and the third optical surface in sequence and injected into the first lens via the second optical surface, then the image beam is reflected by the reflective coating and is transmitted through the first lens via the second optical surface and through the second lens via the third optical surface and the fourth optical surface again, and is projected on the image plane.

2. The projector of claim 1, wherein chief ray angle of the projecting lens is not greater than 40 degrees.

3. The projector of claim 1, wherein a diameter of a lens having a maximum diameter in the relay system is not greater than a diameter of the second lens.

4. The projector of claim 3, wherein the projector satisfies:

$$0.3 \leq D3/D2 \leq 1.0;$$

where the diameter of the lens having the maximum diameter is denoted as D3, and the diameter of the second lens is denoted as D2.

5. The projector of claim 1, wherein the relay system includes a third lens disposed adjacent to the second lens, and the projector satisfies:

$$0.3 \leq D3/D2 \leq 1.0;$$

where the diameter of the third lens is denoted as D3, and the diameter of the second lens is denoted as D2.

6. The projector of claim 1, wherein the first lens and the second lens are both meniscus lenses; the second optical surface of the first lens is a concave surface; the third optical surface of the second lens is a concave surface, and the second optical surface and the third optical surface face with each other.

7. The projector of claim 1, wherein the second optical surface of the first lens has at least one inflection point.

8. A projecting lens, adapted to receive an image beam and project the image beam onto an image plane, the projecting lens comprising:
a relay system, adapted to receive the image beam; and
a projection system, comprising a first lens and a second lens, the first lens comprising a first optical surface and a second optical surface which are opposite to each other, the first optical surface being formed with a reflective coating; the second lens is disposed between the first lens and the relay system, the second lens comprising a third optical surface and a fourth optical surface, the fourth optical surface facing toward the relay system; when the relay system receives the image beam, the image beam is transmitted through the second lens via the fourth optical surface and the third optical surface in sequence and injected into the first lens via the second optical surface, then the image beam is reflected by the reflective coating, and transmitted through the first lens via the second optical surface and through the second lens via the third optical surface and the fourth optical surface again, and is projected onto the image plane.

9. The projecting lens of claim 8, wherein a chief ray angle of the projecting lens is not greater than 40 degree.

10. The projecting lens of claim 8, wherein a diameter of a lens having a maximum diameter in the relay system is not greater than a diameter of the second lens.

11. The projecting lens of claim 10, wherein the projecting lens satisfies:

$$0.3 \leq D3/D2 \leq 1.0;$$

where the diameter of the lens having the maximum diameter is denoted as D3, and the diameter of the second lens is denoted as D2.

12. The projecting lens of claim 8, wherein the relay system includes a third lens disposed adjacent to the second lens, and the projector satisfies:

$$0.3 \leq D3/D2 \leq 1.0;$$

where the diameter of the third lens is denoted as D3, and the diameter of the second lens is denoted as D2.

13. The projecting lens of claim 8, wherein the first lens and the second lens are both meniscus lenses; the second optical surface of the first lens is a concave surface; the third optical surface of the second lens is a concave surface, and the second optical surface and the third optical surface face with each other.

14. The projecting lens of claim 8, wherein the second optical surface of the first lens has at least one inflection point.

* * * * *